UNITED STATES PATENT OFFICE.

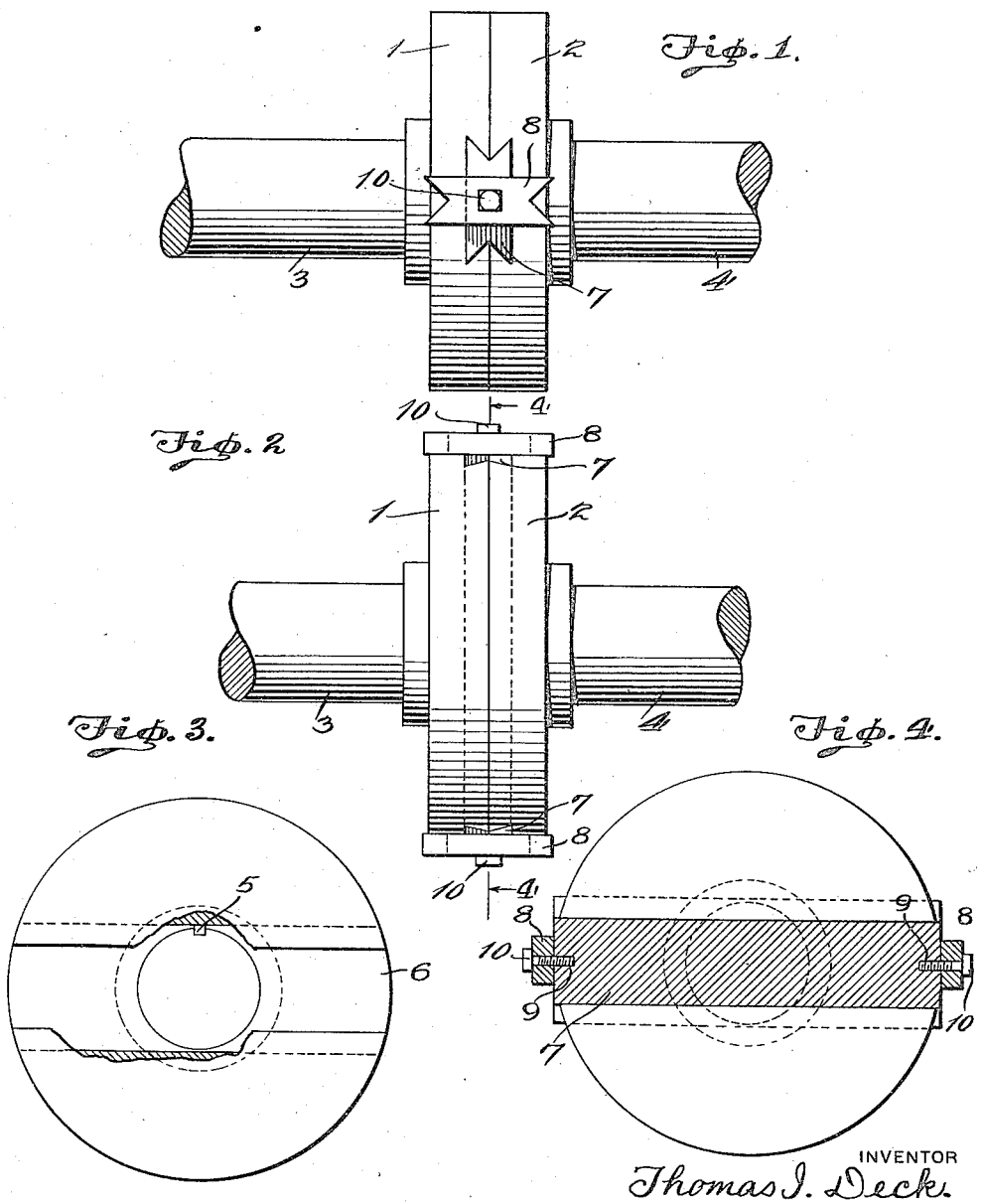

THOMAS I. DECK, OF CANTWELL, MISSOURI.

SHAFT-COUPLING.

1,226,475. Specification of Letters Patent. Patented May 15, 1917.

Application filed August 5, 1915. Serial No. 43,835.

*To all whom it may concern:*

Be it known that I, THOMAS I. DECK, a citizen of the United States, residing at Cantwell, in the county of St. Francois and State of Missouri, have invented certain new and useful Improvements in Shaft-Couplings, of which the following is a specification.

My invention relates to a shaft coupling, and particularly to that class of shaft couplings wherein flanges are mounted on adjacent ends of shafts, said flanges having abutting faces provided with keygrooves in which a key, common to both flanges, is disposed and thereby couples the flanges and shafts in coöperating driving relation.

It is one of the main objects of my invention to provide a shaft coupling of the above mentioned character, wherein the key member is securely locked in position.

Another object of my invention resides in providing the abutting faces of the flanges with dove-tailed grooves and in forming a double dove-tailed key which is slipped into these grooves, when the latter are brought into alinement, and thereby produces practically a solid coupling.

Other objects of my invention will be apparent from the following description, taken in connection with the accompanying drawings wherein I have illustrated and described one practical and simple embodiment of my invention.

In the drawings:

Figure 1 is an elevation of a shaft coupling constructed according to my invention, and showing the end of the key and the locking element.

Fig. 2 is an elevation showing the shaft coupling illustrated in Fig. 1 turned to a different position so as to show the sides of the locking elements.

Fig. 3 is an end elevation of one of the flanges, with fragments thereof broken away to show the details of the dove-tailed groove.

Fig. 4 is a sectional elevation on the line 4—4 of Fig. 2.

In detail:

The coupling shown comprises the two flanges 1 and 2 mounted on the shafts 3 and 4 respectively, and suitably retained thereon by means of keys as illustrated at 5. The adjacent faces of the flanges abut as shown in Figs. 1 and 2 and each is provided with a transversely extending dove-tailed slot 6.

In order to lock the shafts and flanges together a doubled dove-tailed key member 7 is provided which, when the grooves or slots 6 are brought into the coöperating position shown in Fig. 1, may be inserted in the grooves or slots 6 and thus couples the two flanges 1 and 2 in driving relation.

In order to lock the key member 7 in the position shown in Figs. 1 and 2, in which the shafts are coupled in driving relation, locking elements 8 are provided which are in form, similar to the end of the key member 7. The key member 7 is tapped at 9 to receive a set screw 10 as shown in Fig. 4, and the locking elements 8 are apertured so as to permit the set screws 10 to pass therethrough. In assembling the coupling above described the key member 7 and the locking elements 8 are first set up so that the locking elements 8 correspond with the ends of the key members 7. When these parts are in the above-named position they may be inserted in the slots 6 and driven to that position in which each locking element 8 projects above the periphery of the flanges 1 and 2. When the key member 7 is driven to this position the locking elements 8 are given a quarter turn, as shown in Fig. 1, so that the ends of the locking elements overlap and engage the peripheries of the flanges 1 and 2, thereby preventing the key member 7 from moving in either direction. When the locking elements 8 are turned to this position the set screws 10 are adjusted so as to retain these members in place and the coupling is then properly assembled for forming a driving connection of a positive nature between the shafts 3 and 4.

In the foregoing description and drawings, I have set forth one practical embodiment of my invention for the purpose only of illustrating the principles thereof. It is, however, patent that variations and modifications may be resorted to without departing from the spirit and scope of my invention as set forth in the appended claim.

What I claim is:—

In a shaft coupling, the combination with adjacent shafts having abutting flanges thereon and the said flanges being provided in their adjacent faces with dove tailed grooves, a key member of a length equal to the diameters of said flanges adapted for insertion in said grooves, the said key being of double dove tailed construction to snugly engage within said opposing grooves, locking elements on the extremities of said key and being of equal size and shape as the ends of the key, and bolts for pivotally securing said locking elements to said key ends.

In testimony whereof I affix my signature in presence of two witnesses.

THOMAS I. DECK.

Witnesses:
MERRILL McHENRY,
LEE FORCHER.